(12) United States Patent
Kageyama et al.

(10) Patent No.: US 11,192,464 B2
(45) Date of Patent: Dec. 7, 2021

(54) VEHICLE-MOUNTED POWER SOURCE DEVICE

(71) Applicant: Panasonic Intellectual Property Management Co., Ltd., Osaka (JP)

(72) Inventors: Youichi Kageyama, Fukushima (JP); Hiroki Nishinaka, Fukushima (JP); Takashi Higashide, Fukushima (JP); Katsunori Atago, Fukushima (JP); Kazuo Takenaka, Fukushima (JP); Hisao Hiragi, Saitama (JP); Yugo Setsu, Fukushima (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 62 days.

(21) Appl. No.: 16/753,389

(22) PCT Filed: Nov. 6, 2018

(86) PCT No.: PCT/JP2018/041077
§ 371 (c)(1),
(2) Date: Apr. 3, 2020

(87) PCT Pub. No.: WO2019/093289
PCT Pub. Date: May 16, 2019

(65) Prior Publication Data
US 2020/0331356 A1  Oct. 22, 2020

(30) Foreign Application Priority Data

Nov. 10, 2017 (JP) .............................. JP2017-217405

(51) Int. Cl.
*B60L 53/60* (2019.01)
*B60L 50/50* (2019.01)
(Continued)

(52) U.S. Cl.
CPC ............... *B60L 53/60* (2019.02); *B60L 50/40* (2019.02); *B60L 50/50* (2019.02); *H02J 7/0068* (2013.01); *H02J 7/345* (2013.01); *H02J 2207/50* (2020.01)

(58) Field of Classification Search
CPC .......... B60L 53/60; B60L 50/50; B60L 50/40; H02J 7/0068; H02J 2207/50; H02J 7/345
See application file for complete search history.

(56) References Cited

U.S. PATENT DOCUMENTS 10,992,169 B2 * 4/2021 Fukae ..................... B60R 16/03
2015/0001926 A1  1/2015 Kageyama et al.

FOREIGN PATENT DOCUMENTS

JP  2007-074768  3/2007
JP  2008-054363  3/2008
(Continued)

OTHER PUBLICATIONS

International Search Report of PCT application No. PCT/JP2018/041077 dated Jan. 22, 2019.

*Primary Examiner* — Carlos Amaya
(74) *Attorney, Agent, or Firm* — Westerman, Hattori, Daniels & Adrian, LLP (57) ABSTRACT

A vehicle-mounted power source device includes: a power storage unit; a charging unit; a discharging unit; and a control unit which controls operations of the charging unit and the discharging unit in accordance with an activation signal. When the control unit receives the activation signal, the terminal voltage of the power storage unit becomes the first voltage through a charging operation of the charging unit, and when the control unit finishes receiving the activation signal, the discharging unit starts a discharging operation, and the terminal voltage of the power storage unit is reduced to a second voltage lower than the first voltage. The charging unit applies a third voltage lower than the second (Continued)

voltage to the power storage unit between (i) when the terminal voltage of the power storage unit becomes lower than the second voltage or when a predetermined length of time has elapsed since the terminal voltage of the power storage unit became lower than the second voltage and (ii) when the control unit receives the activation signal again.

5 Claims, 3 Drawing Sheets

(51) Int. Cl.
*B60L 50/40* (2019.01)
*H02J 7/00* (2006.01)
*H02J 7/34* (2006.01)

(56) References Cited

FOREIGN PATENT DOCUMENTS

| | | |
|---|---|---|
| JP | 2010-145143 | 7/2010 |
| JP | 2010-145244 | 7/2010 |
| WO | 2013/125170 | 8/2013 |

\* cited by examiner

Prior Art

VEHICLE-MOUNTED POWER SOURCE DEVICE

CROSS-REFERENCE TO RELATED APPLICATIONS

This application is a U.S. national stage application of the PCT International Application No. PCT/JP2018/041077 filed on Nov. 6, 2018, which claims the benefit of foreign priority of Japanese patent application No. 2017-217405 filed on Nov. 10, 2017, the contents all of which are incorporated herein by reference.

TECHNICAL FIELD

The present disclosure relates to vehicle-mounted power source devices used in various types of vehicles.

BACKGROUND ART

Figure 4:
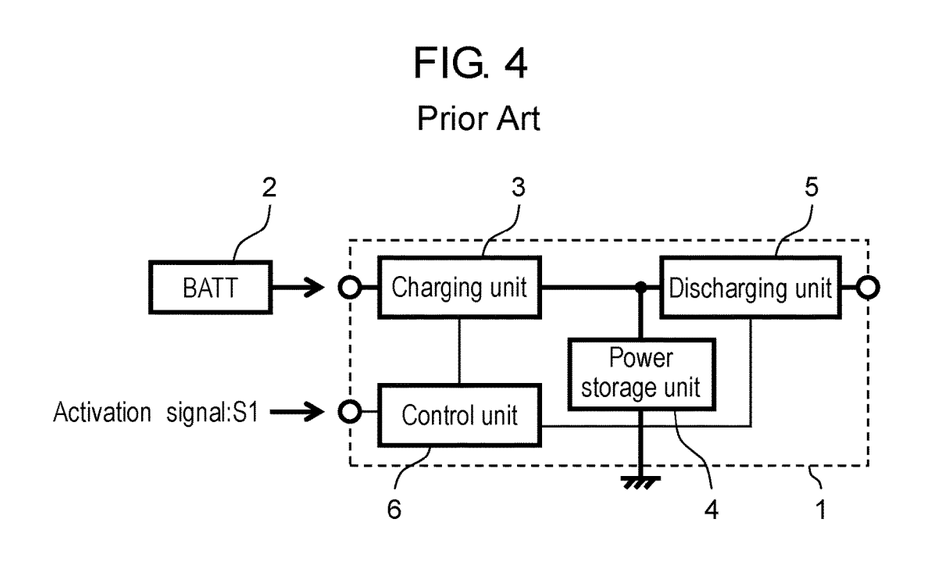
FIG. 4 is a circuit block diagram illustrating the configuration of a conventional vehicle-mounted power source.

The configuration of conventional vehicle-mounted power source 1 is described below with reference to the drawings. FIG. 4 is a circuit block diagram illustrating the configuration of conventional vehicle-mounted power source 1. Vehicle-mounted power source 1 includes: charging unit 3 to which electric power is supplied from battery 2 for vehicles; power storage unit 4 which is electrically charged using charging unit 3; discharging unit 5 which outputs electric power of electrically charged power storage unit 4; and control unit 6 which controls operations of charging unit 3 and discharging unit 5.

In vehicle-mounted power source 1, charging unit 3 charges power storage unit 4 while control unit 6 receives operation signal S1. When control unit 6 finishes receiving operation signal S1, charging unit 3 stops charging power storage unit 4. Subsequently, until control unit 6 receives operation signal S1 again, power storage unit 4 holds charge at a predetermined voltage value (residual voltage value), and vehicle-mounted power source 1 is in the standby mode. When control unit 6 receives operation signal S1 again, charging unit 3 charges power storage unit 4 again, and power storage unit 4 is charged up to the predetermined voltage value.

Note that Patent Literature (PTL) 1, for example, is known as related art document information pertaining to the disclosure of the present application.

CITATION LIST

Patent Literature

PTL 1: International Publication No. 2013/125170

SUMMARY OF THE INVENTION

A vehicle-mounted power source device according to one aspect of the present disclosure includes: a power storage unit; a charging unit connected to an input path of the power storage unit; a discharging unit connected to an output path of the power storage unit; and a control unit which controls operations of the charging unit and the discharging unit in accordance with an activation signal. When the control unit receives the activation signal, a terminal voltage of the power storage unit becomes a first voltage through a charging operation of the charging unit, and when the control unit finishes receiving the activation signal, the discharging unit starts a discharging operation and the terminal voltage of the power storage unit is reduced to a second voltage lower than the first voltage. The charging unit applies a third voltage lower than the second voltage to the power storage unit between (i) when the terminal voltage of the power storage unit becomes lower than the second voltage or when a predetermined length of time has elapsed since the terminal voltage of the power storage unit became lower than the second voltage and (ii) when the control unit receives the activation signal again.

The vehicle-mounted power source device according to the present disclosure can facilitate the control of the terminal voltage of the power storage unit.

DESCRIPTION OF EMBODIMENTS

With conventional vehicle-mounted power source 1 described above, there are cases where a problem occurs upon restart of vehicle-mounted power source 1 after control unit 6 finishes receiving operation signal S1. When there is a need for electrical discharge of discharging unit 5 before power storage unit 4 at a reduced voltage in the standby mode of vehicle-mounted power source 1 is fully charged, there are cases where discharging unit 5 cannot discharge required electric power. Thus, power storage unit 4 needs to always remain charged to at least a predetermined voltage value so that discharging unit 5 can release discharge required electric power at any time. Therefore, power storage unit 4 needs to be continuously charged even while vehicle-mounted power source 1 is in the standby mode. This means that power storage unit 4 needs to be continuously charged even between when control unit 6 finishes receiving operation signal S1 and when control unit 6 receives operation signal S1 again.

Thus, in conventional vehicle-mounted power source 1, charging and discharging control of power storage unit 4 is complicated in order to keep power storage unit 4 charged to at least a predetermined voltage in the standby mode.

In a vehicle-mounted power source device according to the present disclosure, which will be described below, charging and discharging control for keeping power storage unit 4 charged is easy.

Hereinafter, an exemplary embodiment of the present disclosure will be described with reference to the drawings.

Exemplary Embodiment

Figure 1:
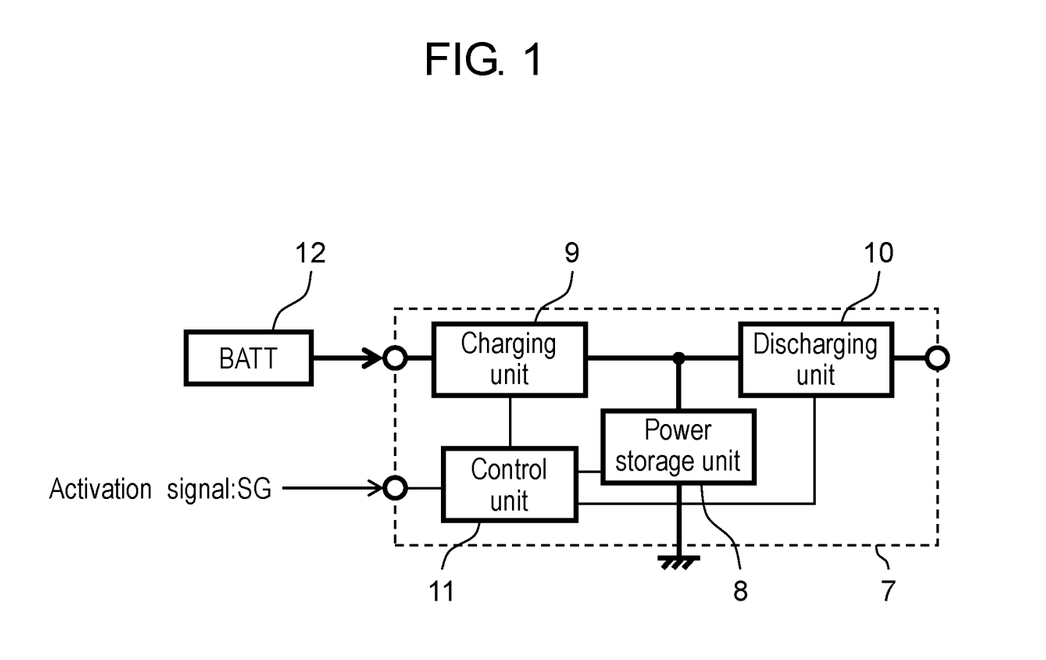
FIG. 1 is a circuit block diagram illustrating the configuration of a vehicle-mounted power source device according to an exemplary embodiment of the present disclosure.
Figure 3:
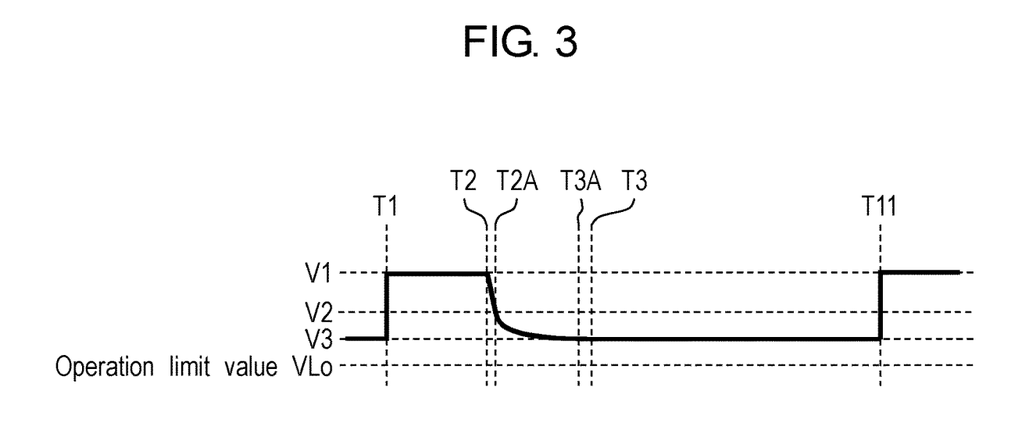
FIG. 3 is a timing chart illustrating a terminal voltage of a power storage unit according to an exemplary embodiment of the present disclosure.

FIG. 1 is a circuit block diagram illustrating the configuration of a vehicle-mounted power source device according to an exemplary embodiment of the present disclosure. FIG. 3 illustrates a terminal voltage of power storage unit 8. Vehicle-mounted power source device 7 includes power storage unit 8, charging unit 9, discharging unit 10, and control unit 11. Charging unit 9 is connected to an input path of power storage unit 8, and discharging unit 10 is connected to an output path of power storage unit 8. Control unit 11 controls operations of charging unit 9 and discharging unit 10 in accordance with activation signal SG.

As illustrated in FIG. 3, the terminal voltage of power storage unit 8 is maintained at first voltage V1 through a charging operation of charging unit 9 while control unit 11 receives activation signal SG (between time T1 and time T2). When control unit 11 finishes receiving activation signal SG (time T2A), the terminal voltage of power storage unit 8 is reduced to second voltage V2 lower than first voltage V1 through a discharging operation of discharging unit 10. Furthermore, charging unit 9 applies third voltage V3 lower than second voltage V2 to power storage unit 8 between when control unit 11 finishes receiving activation signal SG and when control unit 11 receives activation signal SG again (between time T2 and time T11). Note that charging unit 9 does not necessarily need to apply third voltage V3 lower than second voltage V2 to power storage unit 8 between when control unit 11 finishes receiving activation signal SG (time T2) and when charging unit 9 of power storage unit 8 is reduced to second voltage V2 (time T2A).

As in the above explanations of the configuration and the operations, the terminal voltage of power storage unit 8 sequentially changes as follows. The terminal voltage is maintained at first voltage V1 while control unit 11 receives activation signal SG. Next, when control unit 11 finishes receiving activation signal SG, the terminal voltage is reduced from first voltage V1 to second voltage V2. Furthermore, the terminal voltage is reduced from second voltage V2 to third voltage V3 in the period during which control unit 11 does not receive activation signal SG after control unit 11 finishes receiving activation signal SG.

In vehicle-mounted power source device 7 according to the present disclosure, when control unit 11 finishes receiving activation signal SG, the terminal voltage of power storage unit 8 is first reduced to second voltage V2 higher than third voltage V3, which is a constant voltage, instead of being immediately reduced to third voltage V3, which is a constant voltage.

This means that to maintain the terminal voltage of power storage unit 8 at third voltage V3, first, the terminal voltage of power storage unit 8 is gradually reduced first from second voltage V2 to third voltage V3 through self-discharge of power storage unit 8 without charging unit 9 performing a step-up operation. Charging unit 9 applies third voltage V3 to power storage unit 8 during or after the gradual decrease of the terminal voltage of power storage unit 8, and thus the terminal voltage of power storage unit 8 is maintained at third voltage V3. There is no need for charging unit 9 to perform an operation to increase the terminal voltage of power storage unit 8 to maintain the terminal voltage of power storage unit 8. In other words, charging unit 9 does not need to perform an operation to supply a large electric current to power storage unit 8.

Thus, although vehicle 13 will be described later with reference to FIG. 2, in vehicle 13 including vehicle-mounted power source device 7, charging unit 9 does not repeat suspension of charging and resumption of charging in a period during which vehicle 13 is not in operation. Charging unit 9 can be easily controlled when the terminal voltage of power storage unit 8 is maintained at a constant voltage (third voltage V3) using charging unit 9.

[Configuration of Vehicle 13 Including Vehicle-Mounted Power Source Device 7]

Figure 2:
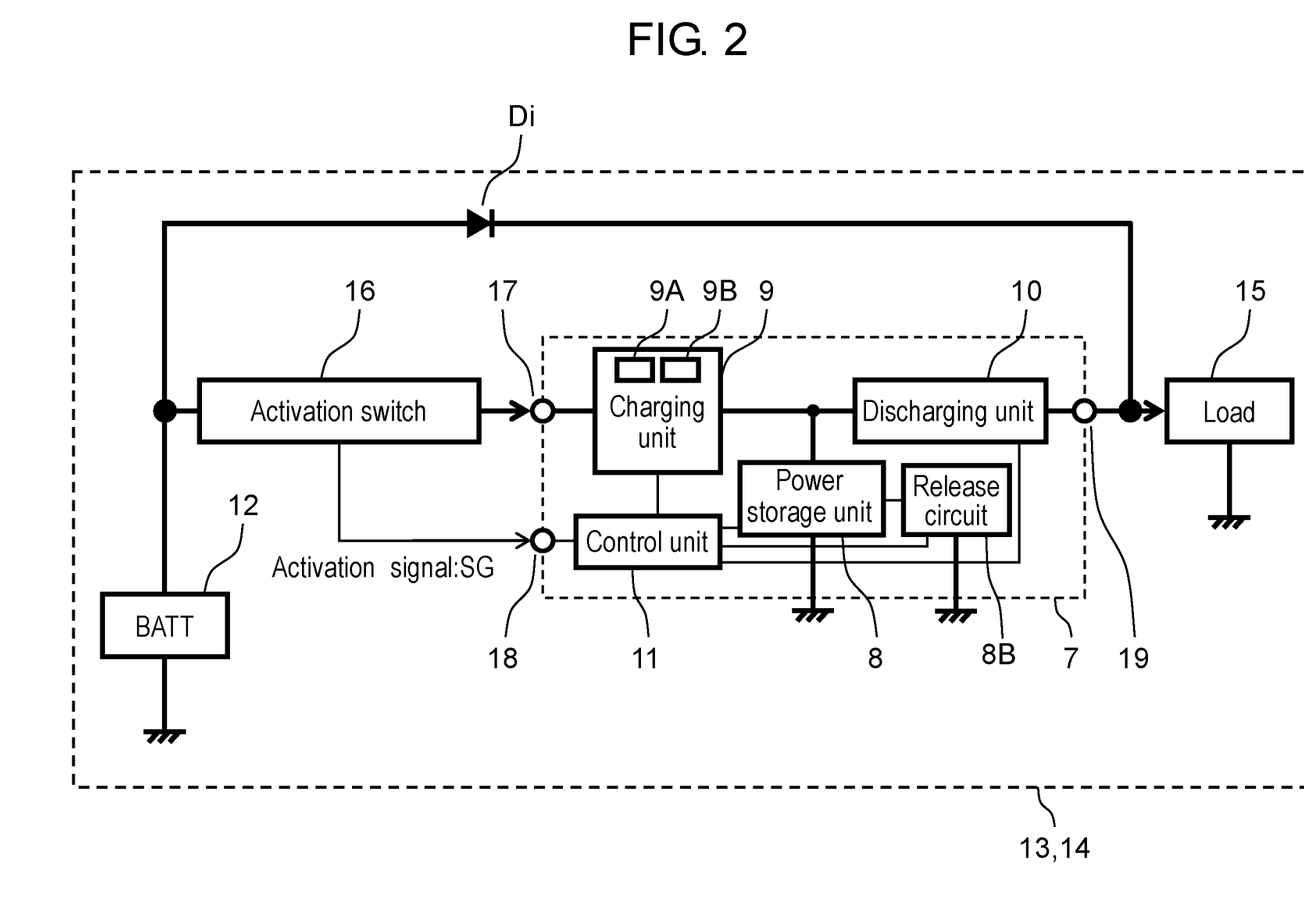
FIG. 2 is a circuit block diagram illustrating the configuration of a vehicle including a vehicle-mounted power source device according to an exemplary embodiment of the present disclosure.

The configuration and operations of vehicle 13 including vehicle-mounted power source device 7 will be described below with reference to the circuit block diagram in FIG. 2 illustrating the configuration of the vehicle including vehicle-mounted power source device 7 according to the exemplary embodiment of the present disclosure and the timing chart in FIG. 3 illustrating the terminal voltage of power storage unit 8 according to the exemplary embodiment of the present disclosure.

Vehicle body 14 of vehicle 13 includes: vehicle-mounted power source device 7; and vehicle battery 12 which supplies electric power to vehicle-mounted power source device 7 and load 15. Vehicle battery 12 is connected to vehicle-mounted power source device 7 via activation switch 16. Vehicle battery 12 is capable of directly supplying electric power to load 15 via diode Di. Note that vehicle battery 12 does not necessarily need to be capable of directly supplying electric power to load 15 via diode Di. Activation switch 16 herein operates in conjunction with an engine switch (not illustrated in the drawings) of vehicle 13.

Note that activation switch 16 may be, for example, a vehicle activation switch (not illustrated in the drawings) or a switch that operates in conjunction with the vehicle activation switch. Vehicle 13 may be an internal combustion engine driven vehicle. Vehicle 13 may be an electrically driven vehicle. Examples of load 15 include, but not limited to, a motor. Note that load 15 is typically a load that requires a large electric current in a short period of time, such as a motor, but is not limited thereto.

Power storage unit 8 uses a power storage element capable of outputting a large electric current such as a lithium battery and an electric double-layer capacitor. In the case of driving load 15 that requires a large electric current in a short period of time, power storage unit 8 desirably includes an electric double-layer capacitor. Aside from the power storage element (not illustrated in the drawings), an electrical circuit (not illustrated in the drawings) related to the power storage element may be disposed in power storage unit 8.

<Explanation of Operations Performed when Vehicle 13 is in Normal State>

Next, operations of vehicle-mounted power source device 7 when vehicle 13 is in a normal state will be described with reference to FIG. 2 and FIG. 3.

Vehicle-mounted power source device 7 operates in the sequence described below. Since activation switch 16 operates in conjunction with the activation of vehicle 13, when an occupant activates vehicle 13, activation switch 16 causes vehicle battery 12 to enter into the state of supplying electric power to vehicle-mounted power source device 7. In other words, vehicle battery 12 enters into the state of supplying electric power to charging unit 9 via input unit 17. Furthermore, when an occupant activates vehicle 13, activation switch 16 operates in conjunction with the activation of vehicle 13, and vehicle-mounted power source device 7 receives activation signal SG. In other words, control unit 11 receives activation signal SG via signal receiving unit 18. Furthermore, in the period during which vehicle 13 operates, in other words, while control unit 11 receives activation signal SG, control unit 11 causes charging unit 9 to periodically or continuously operate in order to charge power storage unit 8 to a predetermined voltage value. The electric power for use in charging power storage unit 8 at this time is supplied from vehicle battery 12.

Next, when an occupant stops vehicle 13, a vehicle control device (not illustrated in the drawings) installed on vehicle 13 stops the output of activation signal SG to control unit 11. Control unit 11 senses that the reception of activation signal SG is suspended, and power storage unit 8 releases a portion of the charge stored therein. In this operation of discharging power storage unit 8, release circuit 8A disposed in or connected to power storage unit 8 may be used, or discharging unit 10 may operate to release the charge. The operation of discharging power storage unit 8 herein is performed in order to adjust the terminal voltage of power storage unit 8. Therefore, load 15 or the like does not need to be driven through the electrical discharge of power storage unit 8.

The foregoing explanation of the operations of vehicle-mounted power source device 7 presupposes control unit 11 having sensed that a proper voltage is supplied from vehicle battery 12 to input unit 17 or charging unit 9. Furthermore, the foregoing explanation of the operations of vehicle-mounted power source device 7 presupposes that vehicle 13 is in a normal state (for example, in the state of being able to travel). Here, it is sufficient that the electric power for driving control unit 11 be supplied from power storage unit 8 or vehicle battery 12.

<Explanation of Operations Performed when Vehicle 13 is in Abnormal State>

The following describes operations of vehicle-mounted power source device 7 performed when vehicle 13 is in an abnormal state. When vehicle 13 is in an abnormal state, vehicle-mounted power source device 7 operates in the sequence described below. The abnormal state of vehicle 13 herein is, for example, the case where vehicle 13 encountered a collision or the like.

First, when an occupant activates vehicle 13, activation switch 16 causes vehicle battery 12 to enter into the state of supplying electric power to vehicle-mounted power source device 7. In other words, vehicle battery 12 enters into the state of supplying electric power to charging unit 9 via input unit 17. Furthermore, when an occupant activates vehicle 13, activation switch 16 operates in conjunction with the activation of vehicle 13, and vehicle-mounted power source device 7 receives activation signal SG. In other words, control unit 11 receives activation signal SG via signal receiving unit 18. Furthermore, in the period during which vehicle 13 operates, in other words, while control unit 11 receives activation signal SG, control unit 11 causes charging unit 9 to periodically or continuously operate in order to charge power storage unit 8 to a predetermined voltage value. Up to this point, the operations of vehicle-mounted power source device 7 are the same as those performed in the case where vehicle 13 is in a normal state.

Next, when control unit 11 senses that the voltage supplied from vehicle battery 12 to input unit 17 or charging unit 9 has dropped below a threshold value even in the state where control unit 11 continuously receives activation signal SG from activation switch 16 after an occupant activates vehicle 13, vehicle-mounted power source device 7 determines this situation as an abnormal state of vehicle 13. When vehicle 13 is determined as being in an abnormal state, vehicle-mounted power source device 7 supplies the electric power stored in power storage unit 8 to load 15 via discharging unit 10 and output unit 19.

Note that a collision sensing unit (not illustrated in the drawings) or the like installed on vehicle 13 may output a signal indicating the occurrence of an abnormality to vehicle 13, and when vehicle-mounted power source device 7 receives the signal, vehicle-mounted power source device 7 may determine vehicle 13 as being in an abnormal state. An external signal receiving unit (not illustrated in the drawings) for receiving the aforementioned signal may be connected to control unit 11 or the external signal receiving unit (not illustrated in the drawings) may be disposed in vehicle-mounted power source device 7.

When vehicle 13 enters into an abnormal state, first, control unit 11 stops the operation of charging unit 9 as the operations of vehicle-mounted power source device 7 which supplies electric power to load 15. When a predetermined period of time has elapsed since control unit 11 stopped the operation of charging unit 9, control unit 11 activates discharging unit 10. Note that although control unit 11 activates discharging unit 10 after the lapse of the predetermined period of time herein, control unit 11 may activate discharging unit 10 in response to an instruction from outside vehicle-mounted power source device 7. Subsequently, the electric power is supplied from discharging unit 10 to load 15 via output unit 19, and load 15 performs an operation for ensuring the safety of vehicle 13, occupants, etc.

<Explanation of Operations Upon Restart of Vehicle 13>

The foregoing describes the operations of vehicle-mounted power source device 7 performed when vehicle 13 is in a normal state and when vehicle 13 is in an abnormal state. The following describes details of operations performed when vehicle 13 returns to a normal operation state after an occupant activates vehicle 13 and further stops vehicle 13 in operation.

As mentioned earlier, when an occupant activates vehicle 13, activation switch 16 causes electric power to be supplied from vehicle battery 12 to vehicle-mounted power source device 7. In other words, vehicle battery 12 enters into the state of supplying electric power to charging unit 9 via input unit 17. At the same time, control unit 11 receives activation signal SG from activation switch 16 via signal receiving unit 18. Timing of this operation corresponds to time T1 in FIG. 3.

In the period during which vehicle 13 operates, in other words, while control unit 11 receives activation signal SG, control unit 11 causes charging unit 9 to periodically or continuously operate in order to charge power storage unit 8 to a predetermined voltage value. The period for this operation corresponds to the period between time T1 and time T2 in FIG. 3. In the period between time T1 and time T2, the terminal voltage of power storage unit 8 is maintained at first voltage V1 by charging unit 9 applying a voltage thereto. Note that the terminal voltage of power storage unit 8 is third voltage V3 in the period before time T1 during which vehicle 13 is not in operation. When vehicle 13 is activated, charging unit 9 needs to charge power storage unit 8 until the terminal voltage increases to first voltage V1. When the terminal voltage of power storage unit 8 is first voltage V1, the step-up/step-down operations of discharging unit 10 and the operation of load 15 are fully available.

Note that in the timing chart illustrated in FIG. 3, the terminal voltage of power storage unit 8 instantaneously increases from third voltage V3 to first voltage V1 at time T1 (time T11). However, the terminal voltage of power storage unit 8 may be gradually increased over a long period of time. In the case where the terminal voltage of power storage unit 8 is gradually increased, the terminal voltage of power storage unit 8 reaches first voltage V1 after time T1, resulting in a time difference from time T1.

The operation of charging unit 9 may be to increase the voltage of vehicle battery 12 or may be to decrease the voltage of vehicle battery 12. Furthermore, the operation of charging unit 9 may be to maintain the voltage of vehicle battery 12. Power storage unit 8 may be charged by any of the operations of charging unit 9.

Next, when an occupant stops vehicle 13 at time T2, control unit 11 senses that the reception of activation signal SG is suspended, and stops the charging operation of vehicle battery 12 for charging unit 9. Subsequently, control unit 11 causes release circuit 8B disposed in power storage unit 8 to operate (or causes discharging unit 10 to operate) so that a portion of the electric power stored in power storage unit 8 is released from vehicle-mounted power source device 7. Note that release circuit 8B disposed in power storage unit 8 may operate as discharging unit 10. Here, control unit 11 controls the operation of release circuit 8B disposed in power storage unit 8 or the operation of discharging unit 10, and thus the terminal voltage of power storage unit 8 is forcibly reduced from first voltage V1 to second voltage V2. Note that second voltage V2 is lower than first voltage V1, but higher than third voltage V3.

The terminal voltage of power storage unit 8 reduced from first voltage V1 to second voltage V2 between time T2 and T2A is then gradually reduced through self-discharge of power storage unit 8 or electrical discharge of discharging unit 10. The amount of decrease in the terminal voltage of power storage unit 8 per unit time on and after time T2A is small compared to the amount of decrease in the terminal voltage of power storage unit 8 per unit time between time T2 and time T2A. Note that the drop in the terminal voltage of power storage unit 8 on and after time T2A is due to self-discharge of power storage unit 8 or electrical discharge of discharging unit 10.

In the timing chart in FIG. 3, since the curve is plotted in the limited display region, the curve (appearing as a straight line in FIG. 3) representing the terminal voltage of power storage unit 8 in the period between time T2 and time T2A and the curve representing the terminal voltage of power storage unit 8 in the period between time T2A and time T3 have partially similar slopes. However, in actuality, the period between time T2A and time T3 is very long compared to the period between time T2 and time T2A. Therefore, the actual average slopes of the curves in the period between time T2 and time T2A and the period between time T2A and time T3 are significantly different.

At time T2A, the forced discharging operation of power storage unit 8 (or the discharging operation of discharging unit 10 through circuit control) is suspended. On the other hand, control unit 11 continues to detect the terminal voltage of power storage unit 8 on and after time T1 and further on and after time T2. However, as mentioned earlier, the amount of decrease in the voltage per unit time through the self-discharge of power storage unit 8 (or the electrical discharge of discharging unit 10) on and after time T2A is small, and thus the detection of the terminal voltage of power storage unit 8 by control unit 11 is temporarily suspended. Whether to continue or temporarily suspend the detection of the terminal voltage of power storage unit 8 by control unit 11 may be determined, for example, depending on the situation in which the electric power supplied from vehicle battery 12 (or power storage unit 8) to control unit 11 is consumed. For example, whether to continue or temporarily suspend the detection of the terminal voltage of power storage unit 8 by control unit 11 may be determined depending on the energy conservation of the driving power of vehicle 13.

Subsequently, in the present exemplary embodiment, charging unit 9 resumes the charging operation for power storage unit 8 at time T3 at which the terminal voltage of power storage unit 8 gradually decreasing on and after time T2A returns to third voltage V3. Note that charging unit 9 may resume the charging operation for power storage unit 8 at time T3 at which the terminal voltage of power storage unit 8 reaches a voltage higher than third voltage V3 by an amount equivalent to a preliminary voltage. Furthermore, when the terminal voltage of power storage unit 8 becomes second voltage V2 at time T2A, charging unit 9 may resume the charging operation for power storage unit 8.

As described above, charging unit 9 resumes the charging operation for power storage unit 8 at time T2A, time T3, or time T3A. In other words, charging unit 9 resumes the charging operation for power storage unit 8 after the terminal voltage of power storage unit 8 becomes lower than second voltage V2 (after time T2A) or after a predetermined length of time has elapsed since the terminal voltage of power storage unit 8 became lower than second voltage V2 (after time T3A, time T3, etc.). The voltage applied by charging unit 9 to power storage unit 8 is third voltage V3.

The above-described charging operation of charging unit 9 for power storage unit 8 continues until time T11 at which vehicle 13 restarts. The terminal voltage of power storage unit 8 becomes third voltage V3 no matter at which of time T2A, time T3A, and time T3 charging unit 9 begins to apply third voltage V3 to power storage unit 8.

The case where an electric double-layer capacitor is used for power storage unit 8 is described as an example. In the case where an electric double-layer capacitor is used for power storage unit 8, voltages at which deterioration of charged power storage unit 8 is less likely to progress over a long period of time are set as second voltage V2 and third voltage V3.

Furthermore, second voltage V2 and third voltage V3 are set to voltage values greater than a limit value (operation limit value VLo) with which discharging unit 10 is capable of normally operating when load 15 can be driven with electric power at output unit 19 (refer to FIG. 3). The operation of discharging unit 10 may be any of a step-up operation, a step-down operation, and a non-transforming operation.

It is sufficient that the difference between second voltage V2 and third voltage V3 be set so that the terminal voltage of power storage unit 8 does not become lower than the third voltage (V3) due to overshoot when the terminal voltage of power storage unit 8 is reduced from first voltage V1 to second voltage V2 between time T2 and time T2A.

Note that in the foregoing description, the charging operation of charging unit 9 is described simply using the term "charging operation". However, charging unit 9 may perform different charging operations in the period between time T1 and time T2 and the period between time T2A and time T11. In other words, charging unit 9 may be set so as to operate differently in the charging operation of charging power storage unit 8 so that the terminal voltage thereof becomes first voltage V1 and the charging operation of charging power storage unit 8 so that the terminal voltage thereof becomes third voltage V3. To put it differently, as illustrated in FIG. 2, charging unit 9 may include first charging unit 9A and second charging unit 9B which operates differently from first charging unit 9A. For example, first charging unit 9A may be configured to handle charging to first voltage V1, and second charging unit 9B may be configured to handle charging to third voltage V3.

A switching converter is preferably used for first charging unit 9A, and a constant voltage linear regulator is preferably used for second charging unit 9B. In the case where the switching converter is used for first charging unit 9A, first charging unit 9A allows a relatively large voltage increase or decrease in a short period of time with reduced power loss. In the case where the constant voltage linear regulator is used for second charging unit 9B, compared to the case where the switching converter is used, there is more power loss, but, because second charging unit 9B supplies a very small amount of electric power during charging to third voltage V3, the power loss is negligible. Furthermore, in the case where the constant voltage linear regulator is used for second charging unit 9B, the operation is limited to the step-down operation, but, no problem occurs because the third voltage (V3) is low as mentioned earlier. The constant voltage linear regulator can be easily controlled when a low voltage is stably supplied, and thus it is desirable to use the constant voltage linear regulator for second charging unit 9B.

When the activation of vehicle-mounted power source device 7 and the power supply from output unit 19 to load 15 become necessary as a result of vehicle 13 entering into an abnormal state in the period between time T2 and time T11 or before the terminal voltage of power storage unit 8 reaches first voltage V1 after the period between time T2 to time T11, an abnormality sensing unit (not illustrated in the drawings) installed on vehicle 13 outputs a signal indicating the abnormal state to vehicle-mounted power source device 7, and thus vehicle-mounted power source device 7 is activated. At this time, the electric power of power storage unit 8 charged to third voltage V3 or a higher voltage is supplied to discharging unit 10. Discharging unit 10 converts the supplied electric power into a voltage required for the operation of load 15, and thus load 15 is driven using discharging unit 10. The driving electric power to be used by control unit 11 and discharging unit 10 in the period between time T2 and time T11 herein is supplied from vehicle battery 12 or power storage unit 8.

In the case where power storage unit 8 is charged so that the terminal voltage of power storage unit 8 becomes third voltage V3, electric power that can be supplied to load 15 is small compared to the case where the terminal voltage of power storage unit 8 is first voltage V1. However, since the period between time T2 and time T11 corresponds to a period after vehicle 13 receives an operation stop command, the driving types of load 15 for emergency are limited in this period; in many cases, large electric power is not required. Therefore, even in the case where power storage unit 8 is charged so that the terminal voltage of power storage unit 8 becomes third voltage V3, vehicle-mounted power source device 7 can supply enough electric power required for load 15.

With the above operations, in the period between time T2A (strictly speaking, time T3 or time T3A) and time T11 during which vehicle 13 is not in operation, third voltage V3, which is applied by charging unit 9 to power storage unit 8, has a value lower than the terminal voltage of power storage unit 8 or substantially equal to the terminal voltage of power storage unit 8. Accordingly, no electric current or an electric current having a very small value flows from charging unit 9 to power storage unit 8. Thus, power consumption by this electric current has a very small value.

If the voltage applied by charging unit 9 to power storage unit 8 has a value greater than the terminal voltage of power storage unit 8, an electric current flowing from charging unit 9 to power storage unit 8 has a large value that cannot be ignored. In the case where the voltage applied by charging unit 9 to power storage unit 8 has a greater value than the terminal voltage of power storage unit 8, the value of the electric current flowing from charging unit 9 to power storage unit 8 is greater of the order of 10 cubed than that in the case where the voltage applied by charging unit 9 to power storage unit 8 has a less value than the terminal voltage of power storage unit 8.

The operation of vehicle 13 is stopped at time T2 in a normal sequence while control unit 11 receives activation signal SG during operation of vehicle 13 after time T1. In the period during which control unit 11 does not receive activation signal SG (the period between time T2 and time T11) after control unit 11 finishes receiving activation signal SG, the terminal voltage of power storage unit 8 is first maintained at first voltage V1, then reduced from first voltage V1 to second voltage V2, and further reduced from the second voltage to the third voltage, as illustrated in FIG. 3. In particular, when control unit 11 finishes receiving activation signal SG (time T2), the terminal voltage of power storage unit 8 is first reduced to second voltage V2 higher than third voltage V3, which is a constant voltage, by time T2A, instead of performing the operation to reduce the terminal voltage of power storage unit 8 from the first voltage to third voltage V3, which is a constant voltage.

Thus, to maintain the terminal voltage of power storage unit 8 at third voltage V3, power storage unit 8 is subject to self-discharge, instead of charging unit 9 performing the charging operation, over the entire period between time T2A and time T3. The terminal voltage is gradually reduced from the second voltage to the third voltage in the period between time T2A and time T3. Charging unit 9 applies third voltage V3 to power storage unit 8 after time T2 or a given point in the period between time T2 and time T3 to maintain the storage voltage of power storage unit 8 at a constant voltage (here, third voltage V3). The terminal voltage of power storage unit 8 at this time has a value equal to or greater than the voltage applied by charging unit 9, and thus charging unit 9 does not need to perform the step-up operation to maintain the terminal voltage of power storage unit 8. Thus, charging unit 9 does not need to perform the operation to supply a large electric current to power storage unit 8.

Therefore, charging unit 9 does not need to repeat "suspension of charging" and "resumption of charging" in the period during which vehicle 13 is not in operation. As a result, it is possible to facilitate the operation of charging unit 9 when charging unit 9 maintains power storage unit 8 at the third voltage, which is a constant voltage.

Furthermore, power storage unit 8 remains charged to a somewhat high constant voltage (the third voltage) at a level such that deterioration of power storage unit 8 does not progress in the period during which vehicle 13 is not in operation. Therefore, upon restart of vehicle 13 at time T11, power storage unit 8 can be charged to first voltage V1 in a short time. As a result, when vehicle 13 restarts, vehicle-mounted power source device 7 can be immediately placed in the state of being able to supply electric power required for load 15 when vehicle 13 enters into an abnormal state.

INDUSTRIAL APPLICABILITY

The vehicle-mounted power source device according to the present disclosure can facilitate the control for maintaining a storage voltage and is useful in various types of vehicles.

REFERENCE MARKS IN THE DRAWINGS 1 vehicle-mounted power source
2 battery for vehicles
3 charging unit
4 power storage unit 5 discharging unit
6 control unit
7 vehicle-mounted power source device
8 power storage unit
8B release circuit
9 charging unit
9A first charging unit
9B second charging unit
10 discharging unit
11 control unit
12 vehicle battery
13 vehicle
14 vehicle body
15 load
16 activation switch
17 input unit
18 signal receiving unit
19 output unit
Di diode
S1 operation signal
SG activation signal
V1 first voltage
V2 second voltage
V3 third voltage

The invention claimed is:

1. A vehicle-mounted power source device, comprising:
a power storage unit;
a charging unit connected to an input path of the power storage unit;
a discharging unit connected to an output path of the power storage unit; and
a control unit which controls operations of the charging unit and the discharging unit in accordance with an activation signal, wherein
when the control unit receives the activation signal, a terminal voltage of the power storage unit becomes a first voltage through a charging operation of the charging unit,
when the control unit finishes receiving the activation signal, the discharging unit starts a discharging operation, and the terminal voltage of the power storage unit is reduced to a second voltage lower than the first voltage, and
the charging unit applies a third voltage lower than the second voltage to the power storage unit between (i) when the terminal voltage of the power storage unit becomes lower than the second voltage or when a predetermined length of time has elapsed since the terminal voltage of the power storage unit became lower than the second voltage and (ii) when the control unit receives the activation signal again.

2. The vehicle-mounted power source device according to claim 1, wherein
the power storage unit includes an electric double-layer capacitor as a power storage element.

3. The vehicle-mounted power source device according to claim 1, further comprising:
a release circuit connected to the power storage unit, wherein
the terminal voltage of the power storage unit is reduced to a second voltage lower than the first voltage using the discharging unit or the release circuit connected to the power storage unit, and
the charging unit applies the third voltage lower than the second voltage to the power storage unit between when the terminal voltage of the power storage unit becomes lower than the second voltage or when the predetermined length of time has elapsed since the terminal voltage of the power storage unit became lower than the second voltage and when the control unit receives the activation signal again.

4. The vehicle-mounted power source device according to claim 1, wherein
the charging unit includes a first charging unit and a second charging unit,
the first charging unit is a switching converter,
the second charging unit is a constant voltage linear regulator,
the first charging unit causes the terminal voltage of the power storage unit to become the first voltage, and
the second charging unit applies the third voltage to the power storage unit.

5. The vehicle-mounted power source device according to claim 2, further comprising:
a release circuit connected to the power storage unit, wherein
the terminal voltage of the power storage unit is reduced to a second voltage lower than the first voltage using the discharging unit or the release circuit connected to the power storage unit, and
the charging unit applies the third voltage lower than the second voltage to the power storage unit between when the terminal voltage of the power storage unit becomes lower than the second voltage or when the predetermined length of time has elapsed since the terminal voltage of the power storage unit became lower than the second voltage and when the control unit receives the activation signal again.

\* \* \* \* \*